United States Patent
Schneider et al.

(10) Patent No.: US 7,516,813 B2
(45) Date of Patent: Apr. 14, 2009

(54) TELESCOPIC LOADER, IN PARTICULAR A REACH STACKER

(75) Inventors: Klaus Schneider, Hergatz (DE); Marco Sonderegger, Dornbirn (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 425 days.

(21) Appl. No.: 11/122,746

(22) Filed: May 3, 2005

(65) Prior Publication Data
US 2005/0247509 A1 Nov. 10, 2005

(30) Foreign Application Priority Data
May 4, 2004 (DE) .................. 20 2004 007 061 U

(51) Int. Cl.
*B62D 5/04* (2006.01)
(52) U.S. Cl. .................. 180/446; 180/444; 180/443; 180/6.28; 180/6.24; 180/402
(58) Field of Classification Search ................ 180/446, 180/444, 443, 6, 28, 6.24
See application file for complete search history.

(56) References Cited

U.S. PATENT DOCUMENTS

| | | |
|---|---|---|
| 5,181,173 A | 1/1993 | Avitan |
| 6,186,265 B1 * | 2/2001 | Boehringer et al. ......... 180/402 |
| 6,634,454 B2 * | 10/2003 | Sugitani et al. ............ 180/402 |
| 6,694,239 B1 * | 2/2004 | Yao et al. ...................... 701/41 |
| 6,708,098 B2 * | 3/2004 | Matsumoto et al. .......... 701/70 |
| 7,143,864 B2 * | 12/2006 | Mattson et al. ............. 180/446 |
| 2002/0153188 A1 * | 10/2002 | Brandt et al. ............... 180/252 |

FOREIGN PATENT DOCUMENTS

| | | |
|---|---|---|
| DE | 10012431 | 10/2000 |
| EP | 1418114 | 5/2004 |
| EP | 1447306 | 5/2004 |
| GB | 2325211 | 5/1997 |

* cited by examiner

*Primary Examiner*—Lesley D. Moerris
*Assistant Examiner*—Marlon A Arce Diaz
(74) *Attorney, Agent, or Firm*—Alleman Hall McCoy Russell & Tuttle LLP

(57) ABSTRACT

The present application relates to a telescopic loader, in particular a reach stacker, having a steering command input device, at least one pick-up to sense the steering angle and a processor unit which is in communication with the steering command input device and with the at least one pick-up and which generates a pre-set signal which can be forwarded to a steering actuator.

11 Claims, 1 Drawing Sheet

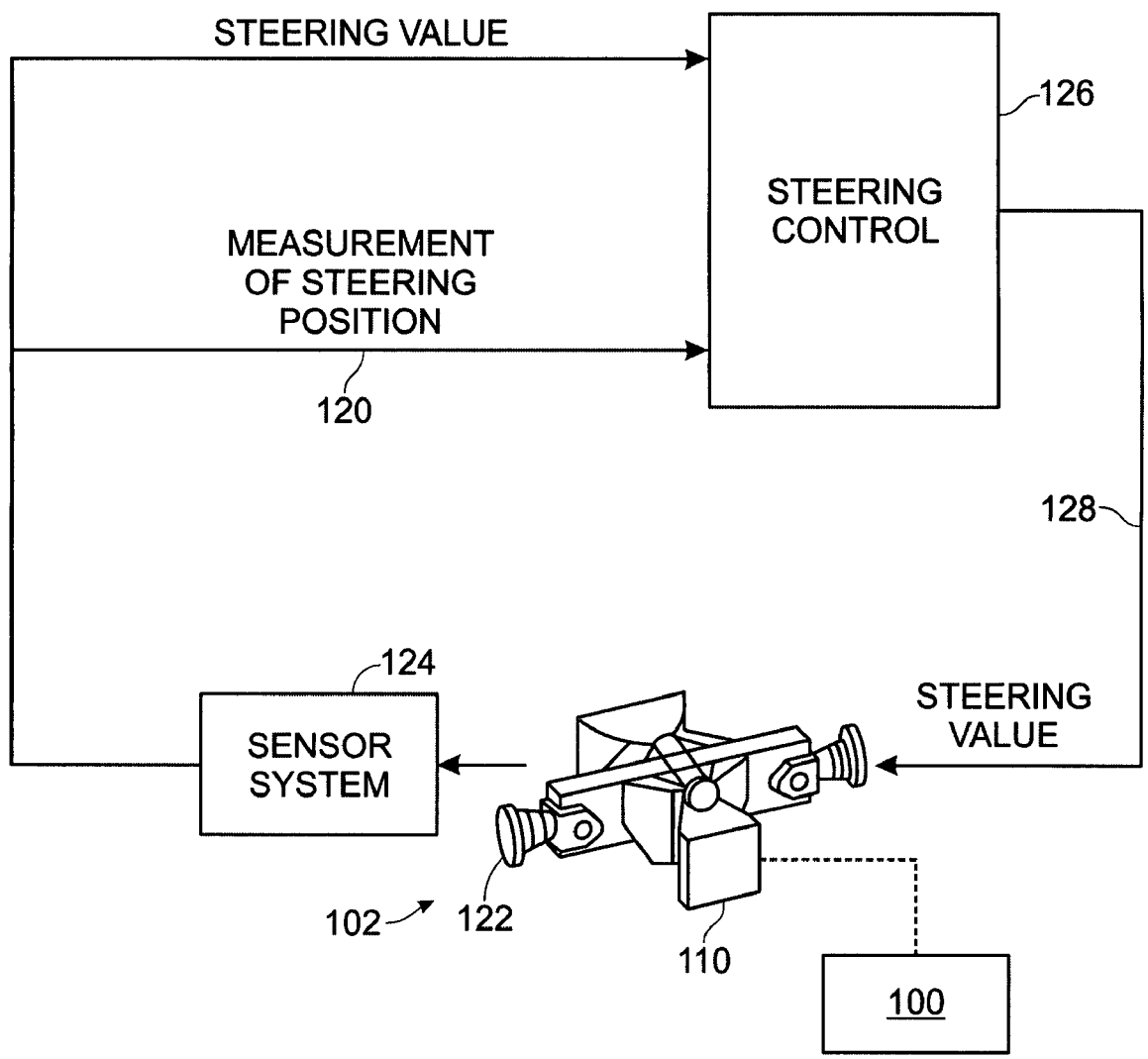

TELESCOPIC LOADER, IN PARTICULAR A REACH STACKER

CROSS-REFERENCE TO RELATED APPLICATION

This application claims priority to German Utility Model Application Serial No. DE 202004007061.8 filed May 4, 2004, which is hereby incorporated by reference in its entirety for all purposes.

FIELD

The present application relates to a telescopic loader, in particular to a reach stacker.

BACKGROUND AND SUMMARY

Reach stackers are vehicles with rubber tires, fitted with a diesel engine and an operator's cabin, similar to a retracted mobile crane. They can transport and stack containers. The previously known reach stackers are designed with a container spreader fixedly connected to the telescopic arm, i.e. the spreader raising movement is only carried out via the telescopic arm. In known reach stackers, the operator's cabin is arranged fixedly or movably connected on the frame in the rear part on the vehicle, which always permits a good view for the operator of the container spreader fixedly connected to the telescopic arm with the current design.

It is advantageous with reach stackers to make the rear wheels as steered wheels. The steering system for the steering of the wheels includes a steering wheel and a mechanical link between the steering wheel and the steering linkage associated with the steered wheels of the rear axle. To permit a simple steering for the driver of the reach stacker, which is heavy in part, in particular under load, electronically supported steering systems are already known, that is steering systems in which the steering movement is supported via servo motors in accordance with the steer angle. Nevertheless, conventional steering systems in reach stackers, which are guided from the operator's cabin to the steered rear wheels, are complex and costly in construction.

It is one object of the present application to provide a steering system for telescopic loaders, in particular reach stackers, which is simple in construction and easy to operate.

In one embodiment, this object is satisfied in accordance with a telescopic loader, in particular a reach stacker, which has a steering command input device, at least one pick-up to sense the steering angle and a processor unit which is in communication with the steering command input device and with the at least one pick-up and which generates a pre-set signal which can be forwarded to a steering actuator.

In one example, the telescopic loader or reach stacker has a so-called "steer-by-wire" steering system. In this steering system, the steering movement of a steering command input device is electronically transmitted from the steering command input device to the steering linkage in that the nominal steering angle value pre-set by the operator is initially transmitted to an electronic control system "by wire". The electronic control system then transmits the adjustment command "by wire" to an actuator or to a steering actuator which can be made as a hydraulic servomotor or as an electric servomotor and generates the steering movement at the steering linkage. The electronic control system processes signals from different sensors. The two most important signals are the nominal value for the steering angle, which is pre-set by the operator at the steering command input device, and the actual value of the position of the steering linkage at the steered rear wheels, which results from the adjustment movement of the actuator.

Further features can provide additional advantages. For example, the steering command input device can advantageously be a joystick. Generally, different "electronic" steering wheels such as a rotating disk or similar would also be feasible as a steering command input device.

The processor unit can particularly advantageously have means by means of which an optimum steering speed can be determined in dependence on one or more operating parameters which can be sensed. Operating parameters of this kind can, for example, be the vehicle speed or the vehicle yaw rate.

It is particularly advantageous with a telescopic loader, in particular a reach stacker, compared with a conventional mechanical steering system, that the steering ratio can be selected freely, for example as a function of the vehicle speed. The steering force support provided can also be freely programmed. In this way, it may be possible to vary the steering ratio and steering force with changes in operating conditions. An active dynamic steering angle correction, which serves the increase of the driving stability, could also be provided as an additional function.

BRIEF DESCRIPTION OF THE FIGURE

Further features, details and advantages will be explained in more detail with reference to an embodiment shown in the drawing. FIG. 1 schematically shows a rear axle of a reach stacker which is not otherwise shown in more detail and which has a steering system in accordance with the invention.

DETAILED DESCRIPTION

In one embodiment, a steering system for telescopic loaders, in particular reach stackers, is provided which is simple in construction and easy to operate. The system has a steering command input device, at least one pick-up to sense the steering angle and a processor unit which is in communication with the steering command input device and with the at least one pick-up and which generates a pre-set signal which can be forwarded to a steering actuator.

In one example, the telescopic loader or reach stacker has a so-called "steer-by-wire" steering system. In this steering system, the steering movement of a steering command input device is electronically transmitted from the steering command input device to the steering linkage in that the nominal steering angle value pre-set by the operator is initially transmitted to an electronic control system "by wire". The electronic control system then transmits the adjustment command "by wire" to an actuator or to a steering actuator which can be made as a hydraulic servomotor or as an electric servomotor and generates the steering movement at the steering linkage. The electronic control system processes signals from different sensors. The two most important signals are the nominal value for the steering angle, which is pre-set by the operator at the steering command input device, and the actual value of the position of the steering linkage at the steered rear wheels, which results from the adjustment movement of the actuator.

Further features can provide additional advantages. For example, the steering command input device can advantageously be a joystick. Generally, different "electronic" steering wheels such as a rotating disk or similar would also be feasible as a steering command input device.

The processor unit can particularly advantageously have means by means of which an optimum steering speed can be determined in dependence on one or more operating parameters which can be sensed. Operating parameters of this kind can, for example, be the vehicle speed or the vehicle yaw rate.

It is particularly advantageous with a telescopic loader, in particular a reach stacker, compared with a conventional mechanical steering system, that the steering ratio can be selected freely, for example as a function of the vehicle speed. The steering force support provided can also be freely programmed. In this way, it may be possible to vary the steering ratio and steering force with changes in operating conditions. An active dynamic steering angle correction, which serves the increase of the driving stability, could also be provided as an additional function.

FIG. 1 schematically shows a rear axle 110 of a reach stacker 100, and which has a steering system 102. The steering angle 120 of the steered rear wheels 122 of a reach stacker 100 is sensed by means of a sensor system 124 that is by at least one pick-up. The sensor system can, however, also pick up other characteristics such as the speed and the vehicle yaw rate of the telescopic loader. At the same time, a steering value, that is a corresponding nominal value, is pre-determined via a joystick which advantageously serves as a steering command input device. Both the nominal value and the value for the current steering position picked up by means of the sensor system as well as, optionally, still further parameters are supplied to a corresponding processor unit, the so-called steering control 126. The desired steer angle, the so-called steering value 128, is determined in the steering control from the sensed parameters and output as a corresponding signal which can be forwarded to the steering actuator.

The setting of the actual steer angle is only possible within the permitted range. One or more pick-ups (redundant design) are provided to determine the actual steer angle.

The steering speed and the steering acceleration are adapted accordingly by the restriction of the possible range of the steering angle to a permitted range, i.e. on a reduction of the permitted range of the steering angle, e.g. on an enlarging of the driving speed of the reach stacker, the steering speed and the steering acceleration are reduced. It is thus achieved that the steer angle and the steering speed do not become too large at high speeds.

The actual steering angle can thus be limited to the maximum permitted steering angle for the respective driving condition by a maximum pre-setting of the steering angle by the driver on the basis of the use of a steer-by-wire steering system.

The invention claimed is:

1. A telescopic loader comprising a steering command input device, at least one pick-up to sense a steering angle, and a processor unit which is in communication with the steering command input device and with the at least one pick-up and which generates a pre-set signal which is forwarded to a steering actuator, wherein the telescopic loader is a reach stacker, and wherein the processor unit furthermore adjusts steering of the reach stacker so that under conditions of increased driving speed of the reach stacker, a maximum permitted steering angle, the steering speed and the steering acceleration are reduced.

2. A telescopic loader in accordance with claim 1, wherein the steering command input device includes a joystick.

3. A telescopic loader in accordance with claim 1, wherein the processor unit furthermore determines an optimum steering speed in dependence on one or more detected operating parameters.

4. A telescopic loader comprising:
   steered rear wheels having a steering actuator coupled in the telescopic loader;
   a telescopic arm;
   a steering command input device coupled in an operator's cabin arranged in a rear part of the telescopic loader;
   at least one pick-up to sense a steering angle;
   at least another pick-up to sense an operating condition of the loader, and
   a processor unit which is in communication with the steering command input device and with the pick-ups, and which generates a pre-set signal which is forwarded to the steering actuator to adjust said steering actuator in accordance with said steering angle and said operating conditions, wherein the processor unit furthermore adjusts steering of the reach stacker so that under conditions of increased driving speed of the reach stacker, a maximum steering angle, steering speed and steering acceleration are reduced.

5. A telescopic loader in accordance with claim 4, wherein the steering command input device includes a joystick.

6. A telescopic loader in accordance with claim 4, wherein the processor unit furthermore determines an optimum steering speed in dependence on one or more detected operating parameters.

7. A telescopic loader in accordance with claim 4, wherein the telescopic loader is a reach stacker.

8. A method for controlling a steer-by-wire system for a telescopic loader, comprising:
   reading a steering command input device from a steering command input device coupled in the telescopic loader;
   reading at least one pick-up indicative of a steering angle;
   generating a pre-set signal in accordance with said steering angle and at least one operating condition of the telescopic loader;
   forwarding said pre-set signal to a steering actuator coupled to steered rear wheels to adjust said steering actuator to vary direction of the telescopic loader via the rear wheels of the telescopic loader; and
   adjusting steering of the telescopic loader so that under conditions of increased driving speed of the telescopic loader, a maximum permitted steering angle, steering speed and steering acceleration are reduced.

9. A method in accordance with claim 8 wherein said at least one operating condition includes a driving speed of the loader.

10. A method in accordance with claim 9, wherein said pre-set signal varies a steering speed in accordance with said steering angle and said driving speed.

11. A method in accordance with claim 9 wherein said pre-set signal varies a steering acceleration in accordance with said steering angle and said driving speed.

* * * * *